C. F. KETTERING.
STORE SERVICE CREDIT SYSTEM APPARATUS.
APPLICATION FILED OCT. 29, 1906.
939,267.
Patented Nov. 9, 1909.
4 SHEETS—SHEET 1.
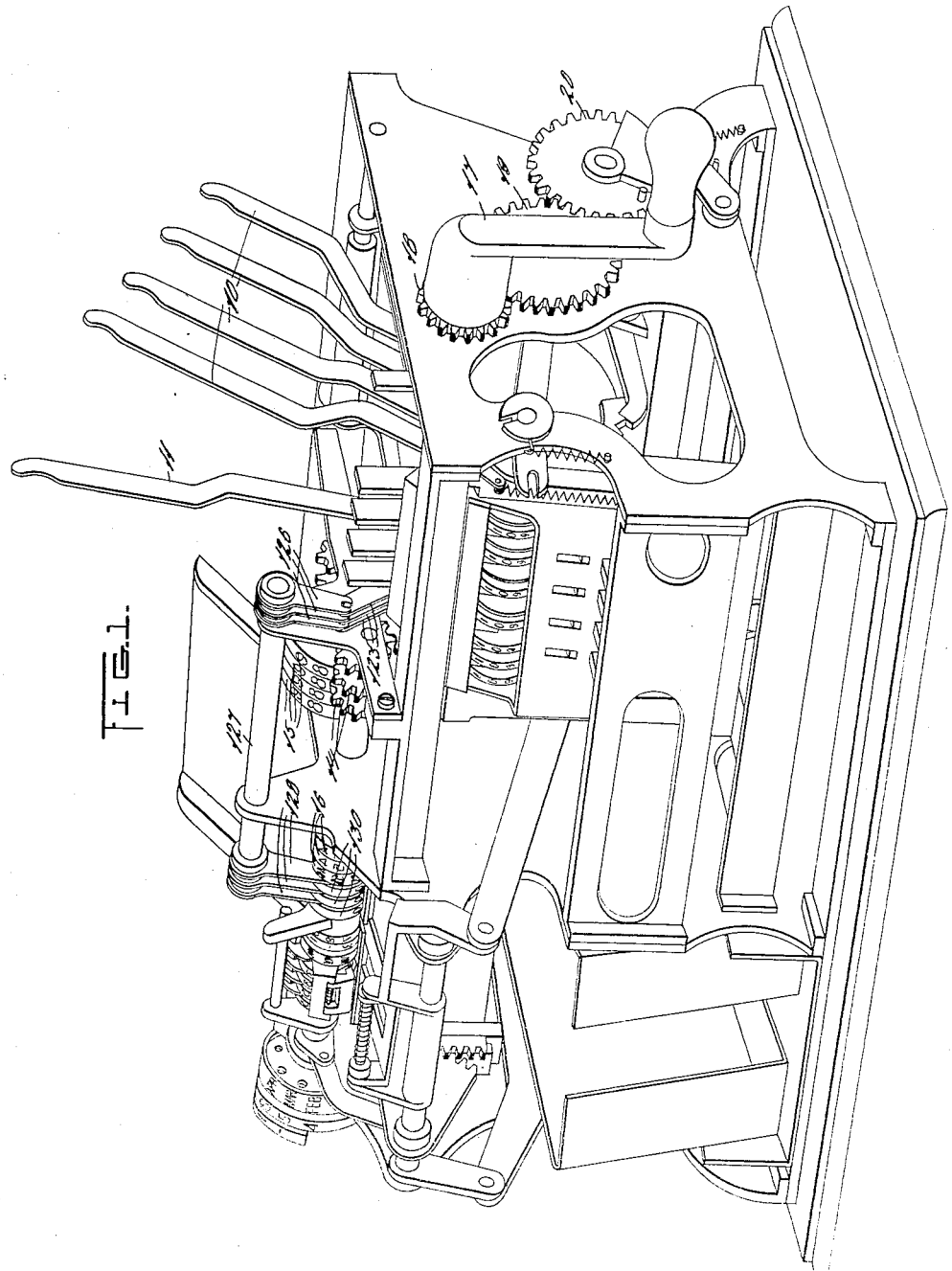
Witnesses
Inventor
Charles F. Kettering
Attorneys

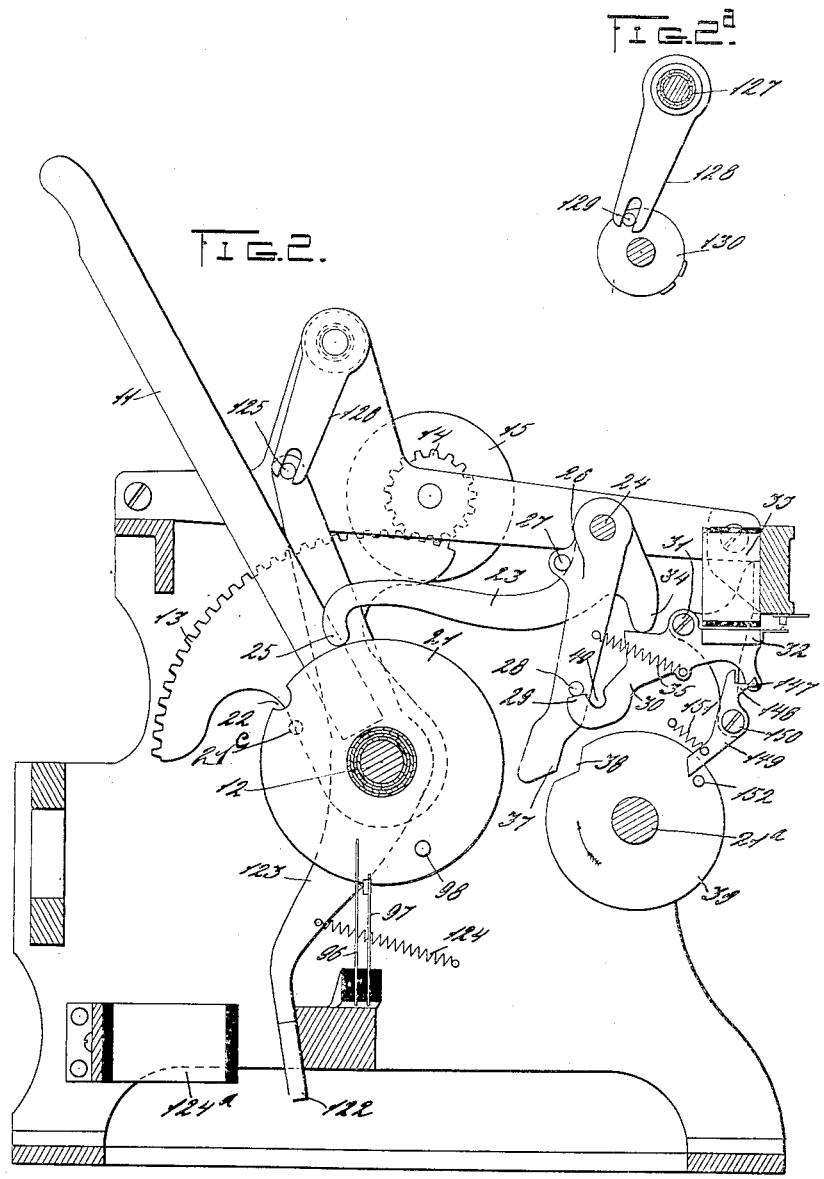

C. F. KETTERING.
STORE SERVICE CREDIT SYSTEM APPARATUS.
APPLICATION FILED OCT. 29, 1906.
939,267.
Patented Nov. 9, 1909.
4 SHEETS—SHEET 3.
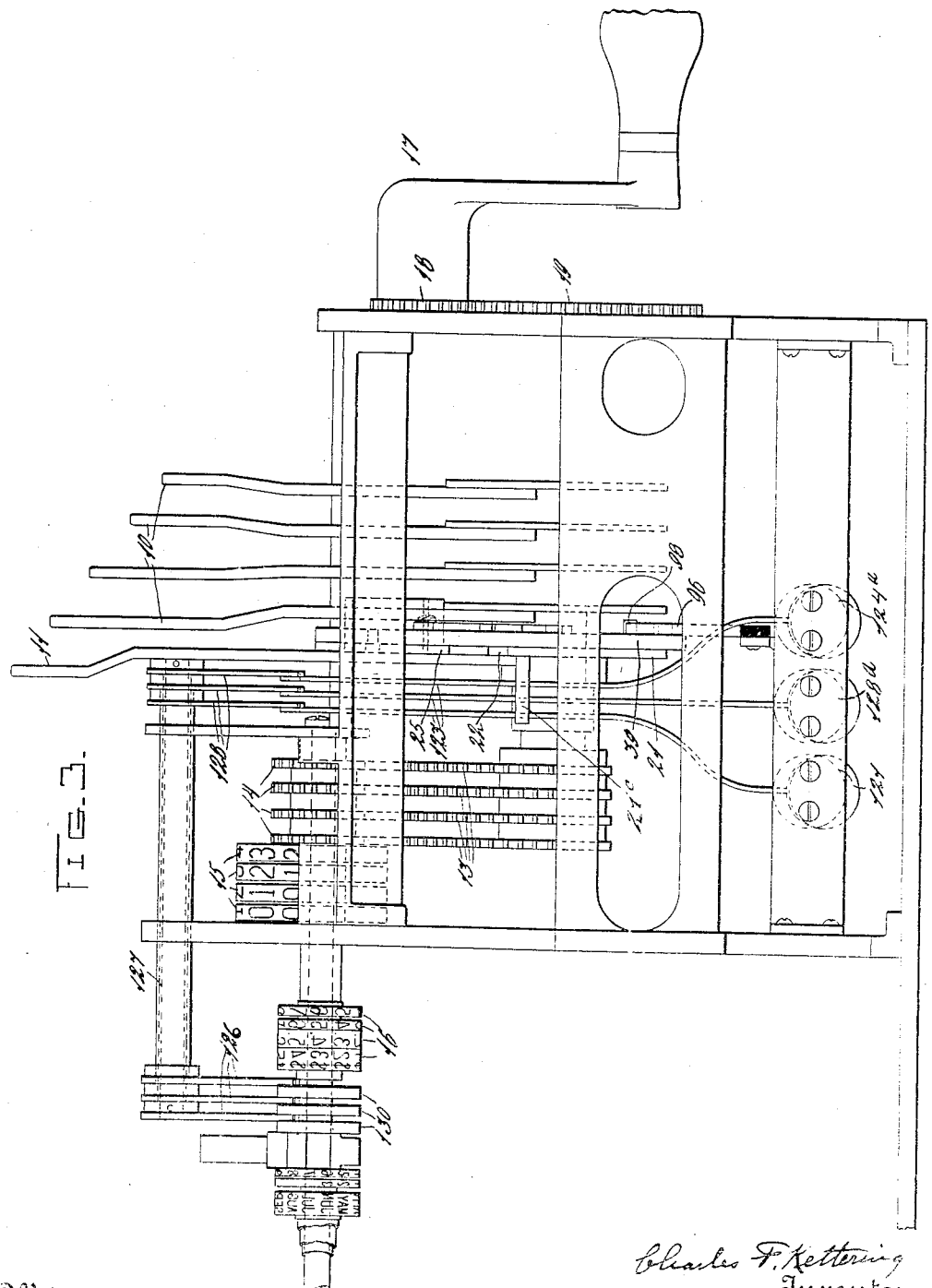

C. F. KETTERING.
STORE SERVICE CREDIT SYSTEM APPARATUS.
APPLICATION FILED OCT. 29, 1906.
939,267.
Patented Nov. 9, 1909.
4 SHEETS—SHEET 4.
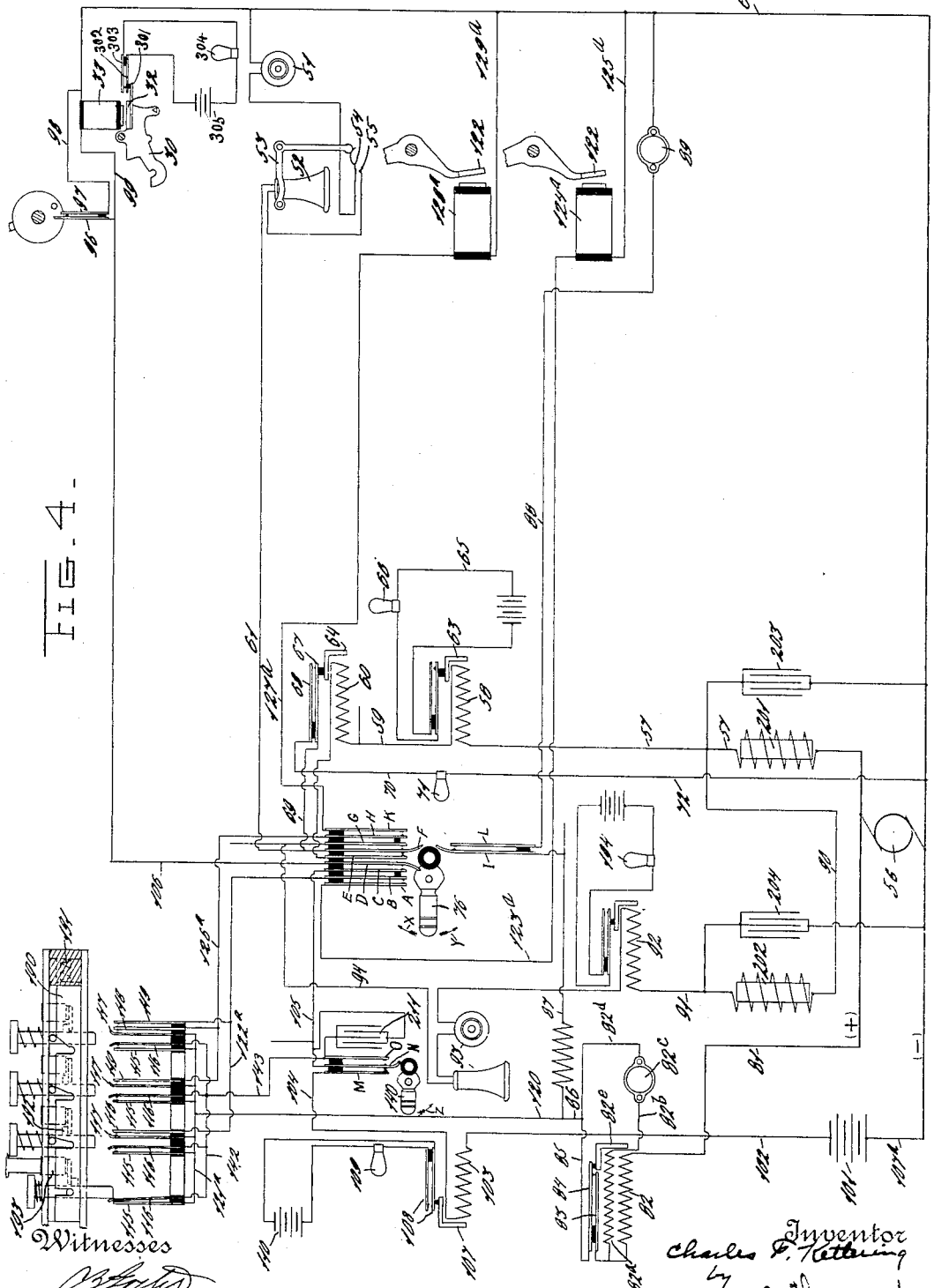
Witnesses
Inventor
Charles F. Kettering
by J. B. Hayward
and R. C. Glass
Attorneys

UNITED STATES PATENT OFFICE.

CHARLES F. KETTERING, OF DAYTON, OHIO, ASSIGNOR TO THE NATIONAL CASH REGISTER COMPANY, OF DAYTON, OHIO, A CORPORATION OF OHIO (INCORPORATED IN 1906).

STORE-SERVICE CREDIT-SYSTEM APPARATUS.

939,267.   Specification of Letters Patent.   Patented Nov. 9, 1909.

Application filed October 29, 1906. Serial No. 341,085.

*To all whom it may concern:*

Be it known that I, CHARLES F. KETTERING, a citizen of the United States, residing at Dayton, in the county of Montgomery and State of Ohio, have invented certain new and useful Improvements in Store-Service Credit-System Apparatus, of which I declare the following to be a full, clear, and exact description.

This invention relates to store service systems and has for its main object to provide an improved system for taking care of credit transactions.

Many commercial houses have the problem of keeping satisfactory track of credit transactions especially in cases where immediate delivery is desired with only a limited opportunity for investigation of the responsibility of the customer. It is evidently unwise to trust the judgment of the salesperson as to whether credit should be extended or not in any given case. It is of course possible to require each clerk to communicate by messenger with a person termed a credit man who is qualified to pass on the question but this method is very slow, so slow in fact that it is very objectionable to the customer. Even with the use of the telephone for communication the system is unsatisfactory in that there is no way of certainly telling whether the credit man really authorized any particular transaction or not. This invention aims to provide a system which will obviate this and other difficulties.

The invention also aims to adapt a system for the purposes described, for use in connection with well known types of registering apparatus now on the market and there has been devised a mechanism which may be adapted for use with almost any type of register now known in the art and which serves when the register is adjusted for the entry of a credit transaction therein to render the same inoperative or ineffective until communication with the credit man has been had as for example over a telephone. The machine can only be rendered operative by the credit man and so the proprietor of the establishment may be sure that no credit transaction without the assent of the credit man has been had.

A further object is to provide an identifying device usable in connection with a registering apparatus which will compel the credit man to set a device which in the register will serve to identify him. This is evidently of value where two or more credit men are employed as it serves to fix definitely the responsibility for each man's action.

A further object is to provide means for indicating to the credit man that the register has been placed in condition to enter a transaction of the particular class therein and this object is obtained by providing mechanism which controls what may be termed a reminding device at the credit man's position.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 is a perspective of the machine to which the invention is shown as applied. Fig. 2 is a section through the credit controlling devices of the machine. Fig. 2ª is a detail of the credit man's identification device. Fig. 3 is a front elevation with parts broken away. Fig. 4 is a diagram of the electrical circuits.

In prior applications Nos. 236,893 filed Dec. 14, 1904 and 301,707 filed Feb. 17, 1906 there has been shown a credit controlling system which accomplishes many of the purposes before referred to. In the present invention the system shown in said applications is used with registering apparatus, and is shown as applied to a register of the type described and claimed in applications of Thomas Carroll No. 75,713 filed Sept. 20, 1901 and 160,416 filed June 6, 1903. It will be evident however that the invention is not limited to this particular type of machine but may be applied to many other registers. In the present system a cash register of the type referred to is employed, this cash register using a series of levers for amounts and other characteristics of transactions to be entered which levers when adjusted serve to set printing mechanism and also adjust racks for controlling the extent of movement of registering wheels. The present system however has nothing to do with the registration and no further mention thereof will be made. Mechanism is provided in the machine such that when the transaction lever is adjusted to a credit position the machine is thereby locked. A telephone is provided with a circuit running to the position of the credit man, said circuit controlling as is usual in telephone practice a line and a pilot relay. When the clerk raises the telephone receiver from the hook the relay serves to cause an illumination of line and pilot lamps thereby calling the attention of the credit man. A switch at the credit station serves to control a signal herein shown as a bell at the clerk's position so that when the credit man is ready to attend to the particular clerk he may sound the bell and communication is then had over the telephone the clerk announcing the customer's name and the amount of credit desired. If the credit man is willing to authorize the credit a second switch serves to control an unlocking or releasing circuit for the machine which can then be operated in the usual manner by the clerk. The system as thus far described is complete but means are provided for indicating at the credit station whether the register has been set to a credit position such means being shown herein as a lamp controlled by a relay operating on a change of resistance. The credit lever of the register serves to control a shunt around the releasing device, said shunt being of very low resistance. When the shunt is closed enough current will pass to operate the relay but if the transaction lever has been moved to the credit position the shunt is thereby broken and the relatively high resistance of the releasing magnet added to the circuit when not enough current to operate the relay armature will pass. To compel the credit man to identify himself at the register with each transaction authorized there are printing devices in the register and means such as keys at the credit station controlling circuit for the printing devices and also controlling in part the releasing circuit. It follows from this that unless one of the credit keys is adjusted the register cannot be released even if the switch therefor is closed.

As before stated this invention is shown as applied to a register now on the market. This register is shown in general in Fig. 1 and comprises amount levers 10 and a special lever 11. These levers are all mounted loosely on a shaft 12 shown in Fig. 2 and carry segments 13 meshing with pinions 14 which serve to move the indicators 15. The segments 13 are also adapted to move the printing wheels 16 shown in Fig. 3 through a series of nested sleeves. It will be seen from this description that when any of the levers are adjusted the printing wheels are correspondingly moved so as to bring to the printing point type for printing figures or letters indicated by the said levers. The operation of the machine is performed by a handle 17 which through pinion 18 and gear 19 operates a gear 20 fast on the main shaft 21$^a$, this shaft being given a complete rotation at each operation of the machine. The rotation of the shaft serves to raise a platen against the type carriers and to then lower the same. No further description of the register now on the market is deemed necessary. It will be evident from the further description that the invention may be applied to many other types of register besides this one.

The transaction lever and connections are shown in Fig. 2. This lever 11 has mounted rigidly therewith besides the usual segment 13 a disk 21 having a cut away portion 22. A lever 23 is journaled on the pin 24 and has its forward end 25 resting on the disk 21. A locking arm 26 is also journaled loosely on the pin 24 and has thereon a pin 27 directly above the arm 23. A second pin 28 on said locking arm 26 is normally over an end 29 of the latching arm 30 which is pivoted on a pin 31 and carries an armature 32 of an electromagnet 33, this magnet being mounted on the main frame of the machine. The rear end 34 of the arm 23 is normally over the latching arm 30 to prevent its being raised. A spring 35 connects the latching arm 30 with the locking arm 26. The credit position of lever 11 is such that notch 22 in the disk 21 is directly under end 25 of arm 23. When the lever is moved to this position the arm 23 will evidently drop in the notch thereby raising the rear end 34 of the said arm and releasing the locking arm 26 as the said arm is carried away from pin 27. Under the influence of spring 35 the locking arm 26 moves so that the V shaped projection 37 on the arm enters a notch 38 of a disk 39 rigidly carried by the operating shaft 21$^a$ and locks the same, this locking being done by the latching arm 30 which also moves under the influence of spring 35 to carry a notch 40 in said arm around the pin 28 on the arm 26. The rotation shaft 21$^a$ is thereby positively locked and no means are provided whereby the clerk may release the same. When the register has been rendered inoperative as above described the clerk communicates with the credit man and this is accomplished by a telephone connection.

Referring to the diagram in Fig. 4 the elements at the right of said figure are all at the clerk's station while the elements at the left of said figure are at the credit man's position. A telephone set of usual construction is provided at each clerks's station including a transmitter 51 and a receiver 52. When the receiver is raised from the hook 53 contacts 54 and 55 are closed and a circuit is then complete as follows; from the generator 56 through the positive main line, wire 57, relay coil 58, wire 59, relay coil 60, contact spring E, contact spring F, wire 61, receiver 52, contacts 55 and 54, transmitter 51, wire 62, and negative main line back to the generator. When this circuit is established relays 58 and 60 are energized and attract their armatures 63 and 64. Armature 63 controls a local circuit 65 including a line lamp 66, and this lamp is thereby lighted. Armature 64 of relay 60 serves to close contacts 67 and 68 and a local circuit is thereby established as follows; generator 56, positive main line, wire 57, coil 58, wire 59, coil 60, contacts E and F, wire 69, contacts 67 and 68, wire 70, lamp 71, wire 72, negative main line back to the generator 56, this evidently serving to illuminate lamp 71 this being termed a pilot lamp in telephone practice. It will be seen by tracing the above circuits that the lamps 66 and 71 remain illuminated even if the receiver 52 is returned to its hook 53. This follows from the fact that relay 60 through its armature 64 serves to close the last mentioned circuit which includes the said relay coil. This relay is therefore a locking relay and maintains its own circuit closed until the local circuit is broken by other means than the replacement of receiver 52 on its hook. The closing of contacts 67 and 68 serves also to maintain the circuit through relay coil 58 so that lamps 66 and 71 both remain lighted. The circuit described which differs from that usually employed in telephone practice is an important feature of the invention on account of the time thereby saved to the clerk. It was stated that the receiver 52 may be replaced on its hook 53 but it will be clear that it need not be removed from the hook at all it being sufficient to call the credit man that the receiver hook is raised and then lowered merely enough to momentarily close the contacts 54 and 55. The credit man's attention being called by the illumination of lamps 66 and 71 he will then signify to the clerk that he is ready to consider the particular case. This is accomplished by moving the switch 76 to close contacts I and L. The switch 76 is here shown as a key having the function of a listening key and a ringing key as well. Its movement as indicated by arrow X is its ringing movement. When this movement is given contacts I and L are closed as above stated and a circuit is then formed as follows; generator 56 positive main line, wire 81, relay coil 82, spring contacts 83 and 84, wire 85, wire 86, wire 87, contacts I and L, wire 88, bell 89, wire 62, and negative main line back to the generator 56. This serves to cause bell 89 to sound as long as key 76 is held in ringing position. It is now necessary to form a talking circuit and this is provided for by a motion in the opposite direction indicated by the arrow Y of the key switch 76. Such motion serves to separate contacts E and F and thereby extinguishes line and pilot lamps 56 and 71 as the circuit through relays 58 and 60 is then broken. A talking circuit is then formed when the clerk has removed receiver 52 from its hook as follows; generator 56, positive main line, wire 57, wire 90, wire 91, relay coil 92, telephone set 93, wire 94, contact G, contact F, wire 61, receiver 52, contacts 55 and 54, transmitter 51, and wire 62 and negative main line back to the generator. The clerk then reads off to the credit man the name of the customer and the amount of credit desired and if the credit man is willing to authorize the credit, the throwing of a second key will serve to release the mechanism. It is, however, important that means should be provided whereby the credit man can know whether or not the register has been placed in position to enter a credit transaction therein and this means will now be described.

Referring to Fig. 2 it will be seen spring contacts 96 and 97 are normally closed but are adapted to be separated by a pin 98 on the disk 21 which engages and moves contact 96 when the lever 11 is set to credit position. As shown in Fig. 4 the contacts 96 and 97 together with wire 98 form a shunt around wire 99 and magnet 33 which as before stated serves to control armature 32 of the latching arm 30. It will be evident that the shunt including contacts 96 and 97 is of very low resistance as compared with magnet 33 so that if contacts 96 and 97 are closed much more current will pass through the line than if they were open and this difference in resistance operates what may be termed a reminding device. The circuit including the said reminding device has instead of the generator 56 a low voltage battery 101 serving to furnish power therefor. The circuit including the battery is as follows; from battery 101, wire 102, relay coil 103, wire 104, contact M, contact N, wire 105, contact C, contact D, wire 106, contacts 96, 97 and wire 98 or wire 99 and relay magnet 33, wire 62, negative main line and wire 107$^a$ back to the battery 101. This circuit includes relay coil 103 and as stated battery 101 is of only low voltage. If contacts 96 and 97 are closed the resistance of magnet 33 is practically cut out of the circuit and enough current will then flow to operate armature 107 of relay 103. This armature controls a local circuit as shown including contacts 108, a lamp 109 and a battery 110. If on the other hand setting lever 11 has been moved to credit position contacts 96 and 97 will be thereby separated and the shunt broken so that the resistance of magnet 33 is then in the line and cuts down the current from battery 101 so much that relay 103 will be unable to operate its armature 107 and lamp 109 will remain extinguished. It will be seen that this provides a simple and yet effective method of indicating to the credit man whether or not the register has been adjusted for the credit transaction and that the said indication is beyond the control of the clerk.

In many establishments it will be necessary to have more than one credit man and in such cases it is very desirable to provide an identification device in the register which will serve to indicate which of the credit men authorized each and every transaction. To accomplish this function printing devices are provided in the register, controlled by magnets whose circuit runs from the register to the credit man's position and which are adapted to be closed so as to set the said printing devices differentially by a series of keys located at the credit man's position.

In Fig. 2 is shown one of three magnets 121, 124$^a$ and 128$^a$; these magnets are also shown in Fig. 3. Armatures 122 are provided for each of the magnets, the said armatures being part of and serving to move levers 123 journaled on shaft 12 against the tension of springs 124. These levers 123 are connected through pins 125 to arms mounted as best shown in Fig. 3 on nested sleeves 127. On the other ends of the sleeves 127 are arms 128 serving through pins 129 to set printing wheels 130. These printing wheels have each two type thereon one of which is normally near printing position while the other is adapted to be brought to printing position when its magnet 121, 124$^a$ or 128$^a$ is energized. With three printing disks as shown eight different combinations of records may be made as will be easily seen. In the diagram however are only shown the two magnets 124$^a$ and 128$^a$ and four keys for differentially controlling them but it will be clear that additional keys may be used.

It will be understood that it is only when a credit transaction is to be entered in the machine that a record is needed from wheels 130 as it is only this class of transaction which needs the authorization of the credit man. It is therefore desirable to provide means for preventing these printing wheels 130 from being moved to a position where either type thereon is at the printing point except when the credit lever is set. This object is accomplished in the present case by normally positioning said wheels 130 as shown in Fig. 2$^a$ with the type away from the printing point. It will be clear that normally no printing will take place during the usual operation of the machine. When, however, the transaction lever is moved for a credit transaction a pin 21$^c$ on the disk 21 (Figs. 2 and 3) abuts all three levers 123 and rocks them enough to bring the lower of the two type on wheels 130 to the printing point. Such movement of levers 123 brings the armatures 122 thereon nearer their magnets so that if the magnets are energized said levers will be moved farther and will bring the second type on wheels 130 to the printing point. It will be seen that the armatures 122 are normally out of the sphere of magnetic attraction but are brought therein by the adjustment of the transaction lever so that the levers 123 may then be set by energizing the magnets. If the transaction lever is set for a credit transaction the type wheels 130 are thereby moved to position for printing the designation of the first credit man while if the magnets are also energized the other credit men's designations will be printed depending on the credit key depressed. In the diagram one of the credit keys is shown as depressed and it will be seen that such depression serves to close contacts 115 and 116. For each of the other credit keys a pair of contacts are provided which are also numbered 115 and 116 in as much as they are all connected in parallel. For the second credit key there are additional contacts 117 and 118; for the third credit key contacts 117 and 119 and for the fourth credit key contacts 117, 118 and 119. When the second credit key is depressed the identifying device will be set, the circuit being as follows; generator 56 positive main line, wire 81, coil 82, contacts 83 and 84, wire 85, wire 86, wire 120, wire 121$^a$, contact 117, contact 118, wire 122$^a$, contact B, contact A, wire 123$^a$, magnet 124$^a$, wire 125$^a$, wire 62, negative main line back to the generator 56. If the third credit key is pressed the circuit will be the same to and including wire 121$^a$, from thence it passes through contact 117, contact 119, wire 126$^a$, contact spring H, contact spring K, wire 127$^a$, magnet 128$^a$, wire 129$^a$, and wire 62 and negative main line back to generator. When the fourth credit key is pressed the circuit will be made as before to and including contact 117 and from thence will pass to both contacts 118 and 119 and from them will reach wire 126$^a$ and 122$^a$ as was separately the case when the second and third credit keys were pressed. It will be seen from this description that when the first key is pressed neither of the magnets 124$^a$ or 128$^a$ are energized, that when the second and third credit keys are pressed the magnets are separately energized and that when the fourth credit key is pressed both magnets are energized and this clearly serves to produce one of four combinations at the printing point of the disk 130 and thereby serves to indicate which credit key was depressed. The credit man may now operate the release key 140 in the direction of arrow Z. When this key is operated contact N is moved from contact M and made to touch contact O and a circuit is thereby made it being remembered that key 76 has been moved in the direction of arrow Y; generator 56 positive main line, wire 81, coil 82, contacts 83 and 84, wire 85, wire 86, wire 120, wire 121ª, contacts 115, 116, wire 142, wire 143, contact O, contact N, wire 105, contact C, contact D, wire 106, wire 99, magnet 33, and wire 62 and negative main line back to the generator. This circuit will be observed to include contacts 115, and 116 controlled by the credit keys and releasing magnet 33 for the register it therefore follows that before magnet 33 can release the machine lock the credit key must have been depressed and such depression serves as before described to differentially operate the credit man's identifying device. When magnet 33 is energized it attracts its armature 32, (Fig. 2) raising a lug 147 thereon over a projection 148 of a pawl 149. This pawl 149 is pivoted on a pin 150 and is normally drawn by a spring 151 as shown but is prevented from movement until armature 32 has been raised by the lug 147. When latching arm 30 moves by raising armature 32 the lug 147 is moved above the projection 148 of pawl 149 and said pawl immediately moves under the lug to retain the arm 30 in its adjusted position. It will be noted that the arm 30 moves to carry its notch 40 away from pin 28 of the locking arm 26 and thereby to unlock the rotation shaft 21ª of the register. It is true that the latching arm 26 is still engaging its projection 37 with the notch 38 of disk 39, but this contact is merely caused by the weight of the part and the pressure of spring 35 so that the shaft 21ª may be rotated without difficulty, and when so rotated will cam the arm 26 out of the position of Fig. 2. This shaft 21ª is rotated in the direction of the arrow and near the end of its complete rotation a pin 152 strikes the tail of pawl 149 and rocks the same enough to withdraw projection 148 from under lug 147 of the latching arm 30. This arm 30 then moves slightly under the influence of spring 35 enough to depress lug 147 slightly below the projection 148 to the position shown in Fig. 2.

The reminding device including the lamp 109 should of course prevent the credit man from attempting to release the register unless the same had been set in a credit position. It may happen however through mistake that the credit man would throw key 140 to close contacts N and O. If at such time the contacts 96, 97 close the shunt around release magnet 33 the resistance of the whole circuit would be so slight inasmuch as coil 82 is of very low resistance that damage to some part of the circuit would probably happen. To avoid such danger as well as to give an indication to the credit man that key 140 should not have been depressed a second coil 82ª is used of relatively high resistance. The circuit through this coil also passes through wire 82ᵇ, a bell 82ᶜ, a wire 82ᵈ and then passes through wire 86, etc., just as does the circuit through coil 82.

It will be seen that coil 82ª and bell 82ᶜ are in a permanently closed shunt of high resistance so that practically all the current will pass through contacts 83 and 84 and not through coil 82ª. Under normal conditions that is when contacts 96 and 97 are separated the resistance of magnet 33 is in the line and the current in the circuit will therefore have so low an amperage as not to operate the armature 82ᵉ of the circuit breaker. If however the shunt including contacts 96 and 97 is closed the circuit has a much lower resistance and enough current will then pass through coil 82 to operate the armature 82ᵉ. Such operation will evidently open contacts 83 and 84 and compel the whole current to pass through the high resistance coil 82ª thereby much diminishing the current strength. In fact it is diminished to so low a value that no injury to the circuit is possible. The separation of contacts 83 and 84 will evidently pass all the current through the bell 82ᶜ and cause the same to sound thereby furnishing an additional warning to the credit man that the shunt around magnet 33 is closed. It is to be noted that if contacts 83 and 84 are separated compelling the whole current to pass through coil 82ª that not enough current will pass through the releasing magnet 33 to operate the same so that the attempt of the credit man to release the machine lock will fail when contacts 96 and 97 are closed. In such case the credit man will again call the clerk by the use of bell 89 and cause the machine to be put in credit position.

To prevent the depression of more than one credit key at a time there is a well known type of interlocking device comprising a slide 190 having differentially inclined slots. A spring 191 shown in dotted lines serves to return the slide 190 to its normal position. This is a well known device and its operation will be obvious. Locks are employed for positively locking any desired key either in raised or depressed position. To perform this function each credit key is provided with a lug 192 and a key operated lock 193 the bolt of which when ejected is adapted to be over the lug 192 of the key depressed or under the said lug when the key is elevated. The first of these positions is shown with regard to the first credit key whereas the other three keys are shown as locked in their elevated position. When the first credit man who is assumed to be on duty leaves his position he will operate his lock 193 withdrawing the bolt when his key will rise under the influence of its spring. The credit man who takes his place can then operate his own lock 193 depress his key and lock the same in depressed position. Such depression of his key will move the slide 190 thereby locking all the other keys in raised position.

The relay 92 which as before stated is in the talking circuit controls a local circuit including a supervisory lamp 194. This lamp will be clearly illuminated only when key 76 has been thrown in the Y direction and receiver 52 of the clerk's telephone removed from its hook. The lamp 194 therefore serves to indicate to the credit man when the said receiver 52 is removed. The relay is well known in telephone practice and no claim to the same is made.

As shown the power for operating the various circuits of this device is drawn from a direct current generator 56. Such a generator will supply a current uniform enough to secure a reasonably satisfactory working of the system but a device is added consisting of inductances 201 and 202 and condensers 203 and 204 for the purpose of securing better results in the telephone. It is well known that the so called direct current generator gives a uni-direction current of nearly a constant voltage but there is a certain small change in the voltage due to the difference of relation which the armature coils of the dynamo sustain to the field magnets thereof as rotation is produced. In other words the current drawn from such a generator may be considered as composed of two currents one having a constant value and the other superposed thereon and being a pulsating current always in the same direction but varying from zero to a small maximum of voltage. It is evident that this superposed current will cause variations in the magnetism of the telephone receiver coils thereby tending to produce undesirable noises. The inductances and condensers referred to are designed to obviate this difficulty. As is well known an inductance offers to a constant current an obstruction dependent only on its ohmic resistance but to a varying current and especially to a rapidly varying current it offers impedance in comparison to which its ohmic resistance is almost negligible. A condenser on the other hand is practically opaque to a constant current but offers only a small impedance to a rapidly varying current. It will be noted inductances 201 and 202 are in series with the line whereas the condensers 203 and 204 are bridged in the line. As used in this system the inductances tend to prevent the passage of the superposed current before referred to and the same is allowed an electrically easy path through the condensers back to the other side of the generator. It follows that the current traversing the main line has a practically constant value as if derived from a storage battery. The condenser 211 is shown as bridged across the contacts N and O of the releasing circuit but this is merely for the purpose of absorbing any break spark and is usual practice.

To indicate to the clerk when the register is released after having been set to a charge transaction and thereby locked, the latching arm 30 is provided with a spring arm 301 which, when magnet 33 is energized and its armature 32 raised, closes contacts 302 and 303 in a local circuit including a lamp 304 and a battery 305. It will be clear that the local circuit will be completed and lamp 304 illuminated only when the machine is released and as the latching arm 30 remains in releasing position until the machine is operated, the local circuit will continue to light lamp 304 until an operation of the machine.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows;

1. A store service system including a cash register having a settable transaction element and an operating mechanism, in combination with a device controlled by said transaction element and serving to lock said operating mechanism, means for indicating at a distance the condition of said element and means for releasing said locking device from a distance.

2. A store service system including a cash register having a movable element for determining the class of entry to be made and an operating mechanism, in combination with a device under control of said element for locking said operating mechanism, means for releasing said locking device from a distance and a device for warning the distant operator when the movable element has not been properly adjusted.

3. A store service system comprising a cash register having a transaction determining element, and an operating mechanism in combination with a device operable when said element has a particular adjustment to lock said operating mechanism, and means operable from a distance for releasing said lock and maintaining same released until said mechanism completes its operation.

4. A store service system comprising a cash register having means for locking same under predetermined conditions independent of the operation of the cash register, means for releasing said locking means from a distance, and an operator identifying means at the cash register set with the release of said locking means.

5. A store service system comprising a cash register having means for controlling the characteristics of transactions entered in the machine, means for locking the machine when a particular transaction is to be entered, means operated electrically from a distance for releasing said locking means and an operator identifying means at the cash register set when the machine is released.

6. A store service system, comprising a cash register having a transaction element and means for locking the cash register when said element is given a predetermined adjustment, means at a distance for disabling said locking means and an identifying device in the cash register adjusted when said locking means is disabled.

7. A store service system comprising a cash register having a transaction element and means for locking the machine when said element is adjusted for a particular class of transactions, means for electrically releasing said locking means from a distance and operator identifying devices at the cash register set automatically by the lock releasing means.

8. A store service system including a cash register having a movable element, an operating mechanism and means for rendering said mechanism inoperative controlled by said element, means operable from a distance for causing said mechanism to be again operative, and operator identifying devices at the cash register set by the operation of said distant means.

9. A store service system, including a cash register having a transaction element, means for locking said cash register when said transaction element is given a predetermined adjustment, and identifying devices, in combination with means at a distance for setting said identifying devices and unlocking said locking means.

10. A store service system comprising a cash register having a transaction element, means controlled thereby to lock the machine, and identifying devices, in combination with distant devices for differentially setting said identifying devices and releasing said locking means.

11. A store service system comprising a cash register having a transaction element, means for locking the cash register when said element is given a predetermined adjustment, and identifying devices, in combination with means at a distance for electrically differentially adjusting said identifying means, and releasing said locking means.

12. A store service system comprising a cash register having means for retaining an entry of transactions therein, in combination with mechanism for rendering said register inoperative when said means is adjusted for a particular class of transactions, devices for releasing the mechanism which renders the machine inoperative and operator identifying means set differentially when said mechanism is released.

13. A store service system comprising a cash register having an element for controlling the entries in the register in combination with means for locking said register when the element is adjusted for a certain class of transactions, operator identifying keys, identifying means adjusted in accordance therewith, and means for releasing said register locking means only when one of said keys has been adjusted and the operator identified.

14. A store service system comprising a cash register having an element for controlling the entries in the register, and means for locking the machine when the element is adjusted for a certain class of transactions, a circuit controlling said locking means, operator identifying means in the register, and circuit controlling devices serving to set said identifying means and close said circuit to release the locking means.

15. A store service system including a cash register having means for rendering same inoperative, in combination with means for rendering the same operative from a distance, and an indicator at the cash register for showing that the machine has been rendered operative.

16. A store service system comprising a cash register having means for rendering same inoperative in combination with means operable from a distance for rendering same operative, and a signal at the cash register brought into operation when said latter means is operated.

17. A cash register having identifying devices in combination with a series of keys, and means controlled by said keys for setting one or more of said devices depending on the key depressed.

18. A cash register having identifying devices, a series of keys and electrically operated devices controlled by said keys for adjusting one or more of said identifying devices when a key is depressed.

19. A cash register having identifying devices, a series of separately depressible keys, and means controlled by a depressed key for adjusting one or more of said identifying devices.

20. A store service system including a cash register having identifying devices and means for locking said machine, and a distant device for setting said identifying devices and preparing for the release of said locking means.

21. In a cash register, the combination with printing devices having each a plurality of type, an entry determining element for adjusting said devices to a constant position, and magnets for then adjusting said devices differentially.

22. In a cash register, the combination with magnets, and means for energizing same, of type carrier controllers normally beyond the sphere of magnetic attraction, and an entry determining element for bringing all of said controllers within said sphere.

23. In a cash register, the combination with electromagnets, of identifying device controllers normally beyond the sphere of magnetic attraction, an entry determining element for bringing all of said controllers within said sphere, and manipulative devices for differentially energizing said magnets.

24. A store service system comprising a cash register having means for locking same, and an entry determining element for operating said locking means in combination with means for releasing said locking means, and a signal brought into operation if attempt is made to operate said locking device when the said element has not been adjusted.

25. A store service system comprising a cash register having an entry determining element and means controlled thereby for locking the machine, in combination with means for releasing said locking means, a signal for warning that the said element has not been set and a distinguished signal brought into action when the warning signal is unheeded and attempt is made to operate said releasing means.

26. A store service system, comprising a cash register having a transaction element and means for locking the cash register independent of its operation when said element is given a predetermined adjustment, means beyond the control of the operator and under control of a second person for disabling said locking means, and an identifying device in the cash register adjusted when said locking means is disabled for establishing the identity of the person effecting such disabling operation.

27. A store service system comprising a cash register having adjustable means for locking same when said means is in a certain predetermined adjusted position independent of the operation of the cash register, means beyond the control of the operator thereof for releasing said locking means, and an identifying means at the cash register set with the release of said locking means.

28. A store service system comprising a register including a transaction designating element, and means for locking said register controlled by said transaction element, of an electromagnet controlling an element of said locking means, with connections for energizing said magnet, and devices actuated by the register for holding said locking means element in releasing position.

29. A store service system comprising a register including a transaction designating element, and means for locking said register controlled by said transaction element, with an electromagnet and connections for releasing an element of said locking means, and a latch actuated from the register for holding said locking means element in released position.

30. A store service system comprising a register including a transaction designating element, and means for locking said register when said transaction element is given a determined position, of an independently operated device for releasing an element of said locking means, a latch for holding said locking means element in releasing position, and connections from a movable part of said register for tripping said latch.

31. A store service system comprising a register with manually controlled means for locking it against operation, a plurality of distant manipulative devices, connections whereby operation of any one of said manipulative devices may cause release of said locking means, and identifying devices, automatically set by operation of any of said manipulative devices, for designating in the register which one of said manipulative devices was employed to release said locking means.

32. A store service system comprising a register with manually controlled means for locking the same, of a plurality of manipulative devices with connections whereby operation of any one of said manipulative devices may cause release of said locking means, a plurality of magnets in said register with connections for separately energizing them by actuation of said manipulative devices, and identifying type carriers positioned under control of said magnets.

In testimony whereof I affix my signature in the presence of two witnesses.

CHARLES F. KETTERING.

Witnesses:
Roy C. Glass,
Carl W. Beust.